(12) United States Patent
Lu

(10) Patent No.: US 11,405,869 B2
(45) Date of Patent: Aug. 2, 2022

(54) ENERGY OPTIMIZED WIRELESS COMMUNICATION FOR RF-ENABLED DEVICES

(71) Applicant: ABL IP HOLDING LLC, Conyers, GA (US)

(72) Inventor: Yenpao Albert Lu, Cumming, GA (US)

(73) Assignee: ABL IP HOLDING LLC, Conyers, GA (US)

( * ) Notice: Subject to any disclaimer, the term of this patent is extended or adjusted under 35 U.S.C. 154(b) by 0 days.

(21) Appl. No.: 16/740,891

(22) Filed: Jan. 13, 2020

(65) Prior Publication Data

US 2021/0219237 A1     Jul. 15, 2021

(51) Int. Cl.
*H04W 52/02*     (2009.01)
*H04W 84/20*     (2009.01)

(52) U.S. Cl.
CPC ........ *H04W 52/0258* (2013.01); *H04W 84/20* (2013.01)

(58) Field of Classification Search
CPC ... H04W 52/0258; H04W 84/20; Y02D 30/70
USPC ............... 370/311; 455/41.1–41.2, 127.5, 455/343.1–343.5, 572–574
See application file for complete search history.

(56) References Cited

U.S. PATENT DOCUMENTS

| | | | |
|---|---|---|---|
| 9,509,402 B2 | 11/2016 | Ryan et al. | |
| 10,210,353 B1 | 2/2019 | Li et al. | |
| 10,270,618 B1 | 4/2019 | Saes et al. | |
| 10,346,649 B2 | 7/2019 | Lu et al. | |
| 10,422,848 B1 | 9/2019 | Li et al. | |
| 2003/0114204 A1* | 6/2003 | Allen | H04W 52/0225 455/574 |
| 2013/0132502 A1* | 5/2013 | Stacey | H04W 56/0015 709/208 |
| 2013/0155925 A1* | 6/2013 | Priyantha | H04W 52/0245 370/311 |
| 2014/0153460 A1* | 6/2014 | Shrivastava | H04W 56/00 370/311 |
| 2015/0043425 A1 | 2/2015 | Aggarwal et al. | |
| 2015/0063232 A1* | 3/2015 | Choi | H04W 4/70 370/329 |

(Continued)

*Primary Examiner* — Michael Y Mapa
(74) *Attorney, Agent, or Firm* — RatnerPrestia

(57) ABSTRACT

Disclosed examples offer ways to manage dialogues between radio frequency-enabled devices and conserve energy of the devices. A system includes a plurality of radio frequency-enabled nodes networked to communicate with a radio frequency-enabled device. The radio frequency-enabled device includes a radio frequency transceiver and a processing device. The processing device is configured to, in response to expiration of a time period or an occurrence of an event, transition the radio frequency-enable device from a standby mode to a transmit mode. In the transmit mode, a start dialogue message is broadcast. After a pause of a predetermined length following the transmission of the start dialogue message, the radio frequency-enabled device transitions to a receive mode to receive a data packet transmitted from one or more of the radio frequency-enabled nodes. Upon completion of receiving the data packet, the radio frequency-enabled device transitions from the receive mode to the standby mode.

32 Claims, 9 Drawing Sheets

(56) References Cited

U.S. PATENT DOCUMENTS

| | | | |
|---|---|---|---|
| 2016/0037613 A1* | 2/2016 | Laherty | H05B 47/185 |
| | | | 315/294 |
| 2017/0085391 A1 | 3/2017 | Aggarwal et al. | |
| 2017/0294879 A1* | 10/2017 | Dosaka | H03F 1/02 |
| 2018/0027631 A1 | 1/2018 | Turvy et al. | |
| 2018/0310247 A1* | 10/2018 | Chu | H04W 52/0235 |
| 2018/0324739 A1* | 11/2018 | Feil | H05B 47/19 |
| 2018/0332538 A1* | 11/2018 | Duan | G06F 1/263 |

* cited by examiner

ENERGY OPTIMIZED WIRELESS COMMUNICATION FOR RF-ENABLED DEVICES

TECHNICAL FIELD

The present subject matter relates generally to techniques and equipment to manage communications between RF-enabled devices and host or primary devices, and conserve battery power of the RF-enabled devices.

BACKGROUND

As the Internet of Things (IoT) and a network of connected devices matures and spreads, conducting a wireless dialogue or exchange of digital messages and communication between a wireless computing device or an RF-enabled devices embedded in everyday objects and a stationary beacon or internet-enabled device is an increasingly commonplace event. The types of devices included in an IoT system may include RF-enabled lights or luminaires in household and commercial environments, mobile devices, smart tags, sensors, smart-watches, video room or doorbell monitors, toys, building management system (BMS) equipment including for example security systems, HVAC, thermostats, water systems, audio systems, etc., cars, and electronic appliances. Often the wirelessly connected IoT device is powered by a small battery, and the host or beacon is powered by a relatively large battery and/or an inexhaustible power source such as the grid or a solar panel.

Many or most of the wirelessly connected IoT devices do not continuously stream data to hosts or beacons. For example, sensors only intermittently send data to beacons (which often hand off the data through a network). As such, the dialogues between the intermittently communicating IoT devices and a corresponding host or beacon tend to be brief and occur at intervals. In these systems, an IoT device may operate in a "receive" mode for long intervals while listening for beacon transmissions that occur at unpredictable times. Operating the IoT device in the "receive" mode consumes a large portion of the IoT device's communication budget.

SUMMARY

Hence a need exists for a system and method to manage the dialogue between the RF-enabled wireless devices and hosts or beacons to conserve and prolong battery power, which in turn reduces costs and labor involved in charging or replacing batteries for the wireless devices.

In an example, a system may include a plurality of radio frequency-enabled nodes networked to communicate in an area. Each respective node is configured to transmit a radio frequency signal. A radio frequency-enabled device is configured to communicate with one or more of the radio frequency-enable nodes. The radio-frequency-enabled device includes a radio frequency transceiver, and a processing device. The processing device is configured, upon execution of instructions maintained in firmware, to transition the radio frequency-enabled device from a standby mode to a transmit mode in response to expiration of a time period or an occurrence of an event. In the transmit mode, the radio frequency-enabled device broadcasts a Start Dialogue message. After a pause of a predetermined length following transmission of the Start Dialogue message, the radio frequency-enabled device transitions to a receive mode to receive a data packet transmitted from one or more of the radio frequency-enabled nodes. The radio frequency-enabled device transitions from the receive mode to the standby mode upon completion of receiving the data packet.

Another example relates to a method that includes transitioning a radio frequency-enabled device from a standby mode to a transmit mode in response to expiration of a time period or an occurrence of an event. Upon transitioning to the transmit mode, broadcasting a Start Dialogue message to one or more radio frequency-enabled nodes networked to communicate in an area. Each respective node is configured to transmit a radio frequency signal. After a pause of a predetermined length following the transmission of the Start Dialogue message, transitioning the radio frequency-enabled device to a receive mode to receive a data packet. Upon completion of receiving the data packet, transitioning the radio frequency-enabled device from the receive mode to the standby mode.

In another example, a system may include at least two radio frequency-enabled devices networked to communicate in an area. Each radio frequency-enabled device includes a radio frequency transceiver, and a processing device. The processing device is configured, upon execution of instructions by the processing device, a first of the at least two radio frequency-enabled devices is configured to transition from a standby mode to a transmit mode in response to expiration of a time period or an occurrence of an event. In the transmit mode, the first of the at least two radio frequency-enabled devices broadcasts a Start Dialogue message. After a pause of a predetermined length following the transmission of the Start Dialogue message, the first of the at least two radio frequency-enabled devices transitions to a receive mode to receive a data packet transmitted by a second of the at least two radio frequency-enabled devices. Upon completion of receiving the data packet, the first of the at least two radio frequency-enabled devices transitions to the standby mode.

Additional advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accordance with the present concepts, by way of example only, not by way of limitations. In the figures, like reference numerals refer to the same or similar elements.

DETAILED DESCRIPTION

Figure 1:
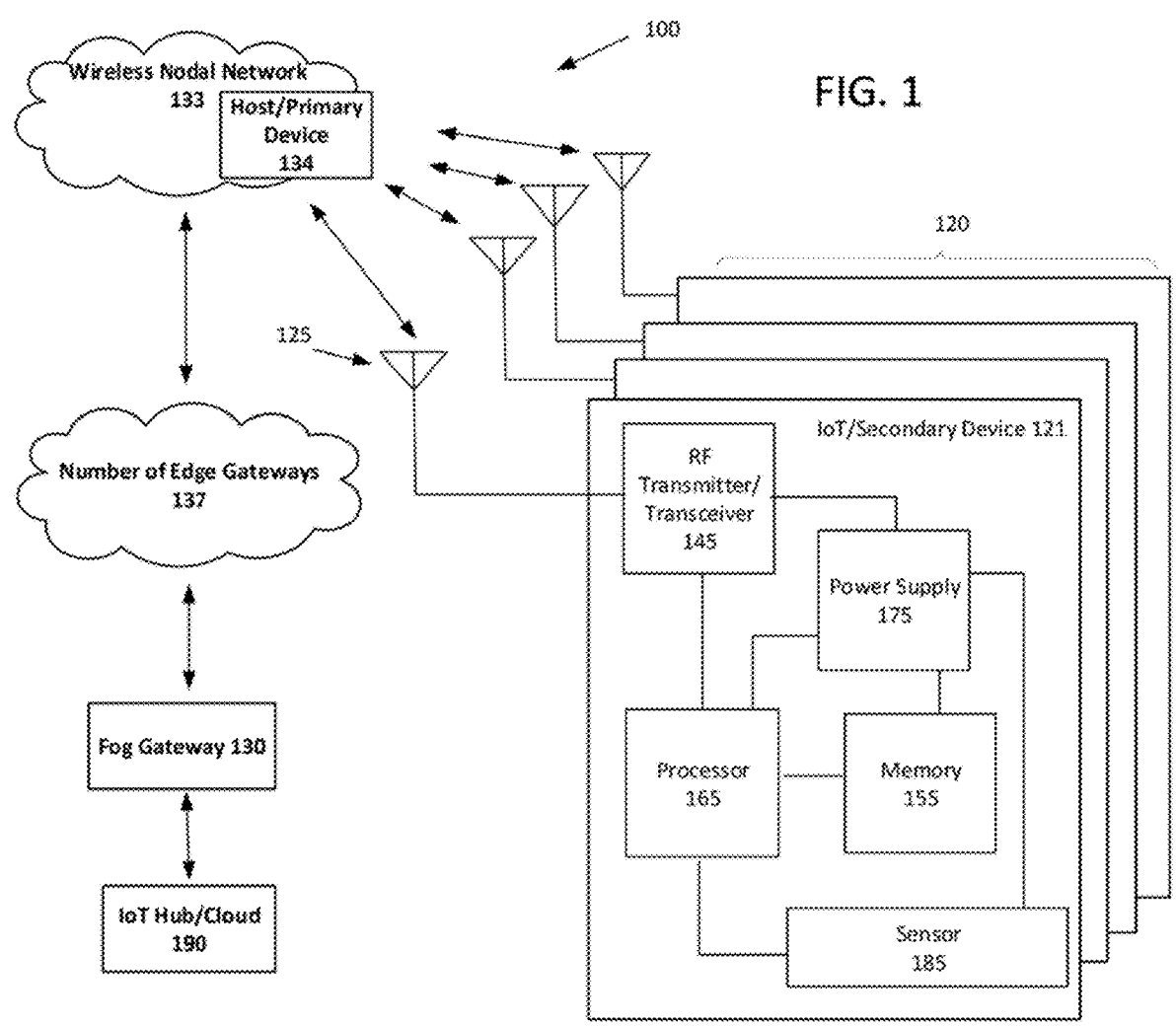
FIG. 1 shows an example system including IoT type radio frequency (RF) enabled wireless devices, RF enabled wireless communication nodes, edge gateways, a fog gateway and an optional IoT hub/cloud system.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various examples disclosed in detail below and in the accompanying drawings relate to dialogue techniques and equipment to manage communication between two or more a radio frequency (RF) enabled devices, for example, between an end-use device and a network node or host type device. Although the dialogue techniques discussed below may be used with a variety of different types or RF-enabled end use devices, most of the system examples relate to internet-of-things (IoT) devices such as mobile devices or smart tags, communicating with host or beaconing devices configured as network nodes. The dialogue techniques, for example, may help to prolong the battery life of the IoT devices and maximize bandwidth of the host device, node or beacon. The IoT device, or host device is any device capable of digital wireless communication with another device. An IoT device (also referenced herein as "secondary device") is typically, although not necessarily, small, mobile, and powered by a battery. The host or node (also referenced herein as "primary device") is typically, but not necessarily stationary and powered by an inexhaustible power source, such as a grid.

The disclosed network architecture and communication dialogue methodology reduce data traffic in a network, and provide improved dialogues between IoT devices and host devices. The dialogue may be implemented via a data communication system. Such a data communication system may include, for example, a plurality of RF-enabled wireless communication nodes distributed about a space, and optionally a number of edge gateways and a fog gateway. Each of the plurality of RF-enabled wireless communication nodes may include a processor and a node radio frequency transceiver. The radio frequency transceiver of an edge gateway may be configured to communicate with the node radio frequency transceivers of RF-enabled wireless communication nodes in the coverage area of the transceiver of the edge gateway, for example, via a first frequency band. The fog gateway may be communicatively coupled to each of the edge gateways. The fog gateway includes a fog gateway radio frequency transceiver and a processor. The fog gateway radio frequency transceiver is configured to communicate with the edge gateway transceiver, for example, via a second frequency band.

The term "node" may refer to an RF-enabled communication device that may provide communication services, e.g. for positioning services, building control system management services, and the like. A node may be a connection point in a network that can receive, create, store and/or send data via communication links within the network. Each node is configurable to transmit, receive, recognize, process and originate and/or forward transmissions to other nodes, other devices operating as an access point to a network, or outside the network. The communication services provided by a node may enable networked and non-networked devices, such as IoT devices, to send data to a node and receive data from the node.

The term "coupled" as used herein refers to any logical, optical, physical or electrical connection, link or the like by which signals or light produced or supplied by one system element are imparted to another coupled element. Unless described otherwise, coupled elements or devices are not necessarily directly connected to one another and may be separated by intermediate components, elements or communication media that may modify, manipulate or carry the light or signals.

The example network architecture utilizes, for example, flooding type communication, e.g. over two radio frequency wireless communication bands/technologies. Generally speaking, network flooding is a communication technique in which a router or the like forwards a message over all of its outgoing routes or ports but not over the route or port through which the router received the message. In some examples discussed more fully below, a source (e.g. fog) gateway floods a message to the edge gateways (e.g. via a wireless broadcast) over a one band or protocol (e.g. WiFi or sub-gigahertz PAN). Then, each edge gateway reformats the message and floods the message to some number of peripheral RF-enabled nodes within range and/or coverage area via wireless broadcasting over another band or protocol (e.g. BLE or Zigbee). In the opposite upstream direction, each IoT type RF-enabled device broadcasts over the other band or protocol (e.g. BLE or Zigbee), a Start Dialogue message for receipt by one of the RF-enable nodes to provide notification of its presence in the area of the host. The RF-enabled nodes are in a default receive mode with respect to transmission of any message or data to the RF-enabled device until receipt of the Start Dialogue message from the RF-enabled device. The RF-enabled nodes and the RF-enabled device switch modes so that the host transmits messages over the other band or protocol (e.g. BLE or Zigbee), to the RF-enabled device. The messages may include data packets flooded to the network by the edge gateway and fog gateway. Upstream data, if any, received from the RF-enabled devices may be sent from nodes via the other band or protocol to the edge gateways from communication to the fog gateway over the first band or protocol.

System and method examples disclosed herein offer ways to manage dialogues between radio frequency-enabled devices and conserve energy of the devices. In the system and method, a plurality of radio frequency-enabled nodes are networked to communicate with a radio frequency-enabled device. The radio frequency-enabled device includes a radio frequency transceiver and a processing device. The processing device is configured to, in response to expiration of a time period or an occurrence of an event, transition the radio frequency-enabled device from a standby mode to a transmit mode. In the transmit mode, a start dialogue message may be broadcast. After a pause of a predetermined length following the transmission of the start dialogue message, the radio frequency-enabled device transitions to a receive mode to receive a data packet transmitted from one or more of the radio frequency-enabled nodes. Upon completion of receiving the data packet, the radio frequency-enabled device transitions from the receive mode to the standby mode.

The system or method may further include one or more of the radio frequency-enabled nodes transitioning from a receive mode to a transmit mode upon receipt of the start dialogue message. The data packet is transmitted to the RF-enabled device during the transmit mode of the one or more radio frequency-enable nodes. Upon completion of transmission of the data packet, the one or more radio frequency-enabled nodes transitions from the transmit mode back to the receive mode.

Reference now is made in detail to the examples illustrated in the accompanying drawings and discussed below. FIG. 1 illustrates an example system 100 including IoT type frequency (RF) enabled devices or secondary devices 120, a network 133 of RF enabled wireless communication nodes 134, a number of edge gateways 137, a fog gateway 130 and an optional IoT hub/cloud system 190.

Each RF-enabled IoT device 121 of the RF-enabled IoT devices 120 may be a small, smart, powered device that exchanges radio signals with one or more of the radio frequency-enabled nodes, for example, a host/primary nodal device 134, having networked radio capability, such as the network 133 of similar RF-enabled wireless communication nodes 134. Each IoT/Secondary device 121 is configured to operate in a standby/neutral mode and in at least one of transmit or receive modes to communicate with the host/primary device 134, as well as to process data and send information within the system 100. In most examples, the networked hosts or nodes 134 of the network 133 are lighting devices enabled for RF wireless communication. The IoT device 121 may operate in a wireless flooding network of the RF-enabled lighting devices (described in FIG. 4). The system 100 may include a number of IoT/Secondary devices 120, a network of RF-enabled wireless nodes 133, a number of edge gateways 137, a fog gateway 130, and an IoT hub 190 (such as a server application running on a cloud platform). The system 100 is configured to enable the IoT/Secondary devices 120 to send messages designated for delivery, for example, to one of the host devices 134, the number of edge gateways 137, and/or to the fog gateway 130. A detailed discussion of an example configuration of one of the IoT/Secondary devices 120 is provided below.

In order to communicate, each IoT device 121 may include an antenna 125, a radio frequency (RF) transmitter or transceiver 145, a processor 165, and a memory 155. Optionally, each IoT device 121 may further include at least one sensor 185. The antenna 125 may be coupled to the RF transmitter or transceiver 145, and configured to receive and/or emit wireless RF signals within a specific first radio frequency band that is compatible with the RF transmitter or receiver 145. The RF transmitter/transceiver 145 may be a Bluetooth transmitter/transceiver, a Zigbee transmitter/receiver, a radio frequency identifier (RFID) transmitter/transceiver, a WiFi transmitter/transceiver, a 900 MHz band personal area network (PAN) transmitter/transceiver, or other wireless communication transmitter/transceiver suitable for use in an IoT device.

The processor 165 may be coupled to the RF transmitter/transceiver 145, the power supply 175, the memory 155 and the sensor(s) 185 of the respective device 121. The processor 165 may send packetized data signals to the RF transmitter/transceiver 145 for transmission and/or receive packetized data signals received by the RF transmitter/transceiver 145 obtained via the antenna 125. For example, the fog gateway 130 may be able to download commands via the number of edge gateways 137 to individual nodes (not shown) within the network of RF-enabled wireless communication nodes 134 and/or for communication to an IoT device 121. In a tracking example, where the IoT device 121 receives and processes signals and sends responses, the processor 165 may receive packetized data signals from the RF transmitter/transceiver 145 based on RF signals received via the antenna 125, where the received packets contain identifiers of RF enabled nodes 134 that are transmitting in the vicinity of the of the particular IoT device 121. In that tracking example, the processor 165 may send packetized data signals to the RF transmitter/transceiver 145 for upstream transmission through network 133, where the transmitted packet(s) include identifiers of two, three or more of the nodes providing the RF signals received with the best signal parameter (e.g. highest signal strength) at the particular IoT device 121. As another example, during upstream transmission from the IoT-type devices to host 134, the transmitted packet(s) may include, for example, sensor or location data.

The IoT device memory 155 may be a non-volatile memory, random access memory (RAM), read only memory (ROM), a Flash memory or the like. The memory 155 may be configured to store programming instructions executable by the processor 165. Upon execution of the programming instructions stored in the memory 155, the processor 165 may be configured to perform different functions. Examples of the different functions that the processor 165 may be configured to perform upon execution of the programming instructions are described in more detail with reference the examples of FIGS. 3-6. The different functions may be internal to the processor 165. For example, the processor 165 may include a counter that is monitored by the processor 165. At a predetermined count, the processor 165 may transmit a signal, such as a basic message.

The power supply 175 may be a battery, a solar cell, or other form of quickly available power that is suitable for driving the various electronics associated with the components of the particular type of device 121, such as the RF transmitter/transceiver 145, the processor 165, the memory 155 and/or the sensor 185. For IoT devices such as asset tracking tags, and some mobile devices, the power supply 175 may have relatively limited capacity, particularly in comparison to power supply capacity available at the RF enabled host/primary nodes 134 of the network 133.

The sensor 185 may be configured to detect and respond to an event that occurs in the environment in which the IoT device 121 is located. For example, the sensor 185 may be, one or more of an accelerometer, thermometer, a photocell, a microphone, a shock sensor, or the like. In response to a detected stimulus (e.g., temperature, movement, noise, ambient light), the sensor 185 may output a signal causing the processor 165 to perform a function or process such as generation and transmission of a basic message. Such transmission, for example, may utilize an enhanced communication dialogue procedure as described more fully, later.

Examples of such a function or process are described in more detail with reference to other figures. For example, each of the IoT devices, such as 121, may be configured to transmit signals, such as a basic message, a status message and other wireless RF signals, to one or more of the RF-enabled wireless communication nodes 134 of the network 133. One or more of the RF-enabled wireless communication nodes 134 of the network 133 may be configured to receive the signals transmitted from respective IoT devices 120.

The IoT devices 120 may also be configured to receive signals, for example, from the fog gateway 130 via the network of the edge gateways 137 and the network of RF-enabled wireless communication nodes 134. More details of this function of the example of system 100 is described in reference to other figures.

The number of individual RF-enabled wireless communication nodes in the network of RF-enabled wireless communication nodes 133 may be 10, 100, 1000 or more. Each of the RF-enabled wireless communication nodes (shown in other examples) of the network of RF-enabled wireless communication nodes 134 may be configured with a compatible RF transceiver to communicate with the RF transmitter/transceivers 145 of the IoT devices 120. The RF transceiver of a respective node 134 in the network 133 may be a Bluetooth transceiver, a Zigbee transceiver, a radio frequency identifier (RFID) transceiver, a Wi-Fi transceiver, a PAN transceiver, or other wireless communication transceiver.

The respective RF-enabled nodes 134 of the network 133 may be configured to transmit signals to the edge gateways 137. The signals transmitted by the respective RF-enabled node 134 may include information obtained from the signals transmitted by the respective ones of the IoT devices 120. Continuing with the device-tracking example, the transmitted signals to an edge gateway 137 may carry a tuple or the like containing the node identifiers for some number of the nodes 134 that the device processor 165 selected from among node transmission received at the device 121.

The number of edge gateways 137 may include one, two or more individual edge gateways. The number of edge gateways 137 may be less than the number of nodes in the network of RF-enabled wireless communication nodes 134. Each of the edge gateways 137 may be include a processor, a transceiver system including a first radio-frequency transceiver and a second radio-frequency transceiver, and a memory (not shown in this example). For example, the first radio-frequency transceiver of each edge gateway may be configured to operate in the first frequency band compatible with the node radio frequency transceivers. The second node radio frequency transceiver of each edge gateway may be configured to receive and transmit signals in a second frequency band different from the first frequency band. The edge gateways of the network 137 may use the second radio frequency transceiver to receive and transmit signals in the second frequency band from and to the fog gateway 130. For example, each edge gateway may be configured to receive signals according to a first communication protocol in the first RF band (e.g., Bluetooth), translate and/or convert the received signals into a second communication protocol in the second RF band (e.g. WiFi or sub-GHz). Details of an edge gateway will be described in more detail with reference to FIGS. 6A-6C.

The fog gateway 130 may include a fog gateway radio frequency (RF) transceiver, a processor and a memory (not shown in this example). The fog gateway RF transceiver may be compatible with and communicate with RF transceivers of the edge gateways. Since the fog gateway RF transceiver is compatible with an RF transceiver of the edge gateway, the fog gateway 130 may be communicatively coupled via the fog gateway radio frequency transceiver to each of the edge gateways of the number of edge gateways 137.

As disclosed above, the IoT devices 120 operate with the system 100 having wireless network of RF-enabled nodes 134 and a number of edge gateways 137, it may be helpful next to consider a simple system configuration for use in a further discussion of an operational example.

Figure 2:
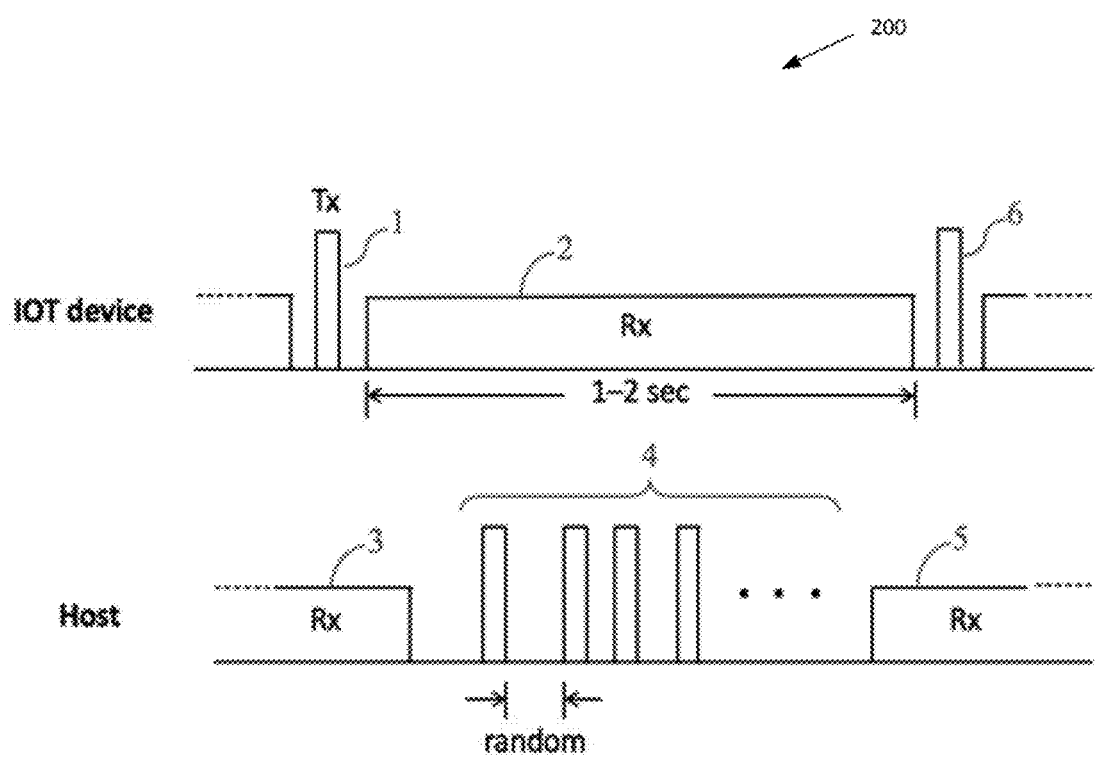
FIG. 2 is a timing diagram for a communication dialogue between an IoT type RF enabled device and a Host/node type RF enabled device of the Related Art.

FIG. 2 is a timing diagram for a communication dialogue between an Internet of Things (IoT) device and a Host/RF device of the Related Art.

In the Related Art, the timing of device dialogues is governed by a Host/Primary device. The Secondary devices are battery powered and must operate in a receive mode for long periods to increase the integrity of the signal broadcast by Primary devices. In the timing diagram 200 of FIG. 2, the upper portion represents states of the communication dialogue of the IoT device, and the lower portion represents states of the communication dialogue of the Host device. Protocols such as Bluetooth Low Energy (BLE) standard include provisions for energy-conserving management of device dialogue in which an IoT device such as a mobile device operates in a receive mode or a periodic transmit mode. During the periodic transmit Tx mode, for example, the IoT device may transmit a "heartbeat" to announce its presence in an area or other data package. The IoT device remains in the receive (Rx) mode for long intervals, e.g. 1000 msec, 1-2 seconds or more, to "listen" for beacon transmissions from a Host/RF device that may occur every 100-150 msec or at unpredictable times which requires a lot of the IoT device's power and reduces the life of the IoT device. A Host usually transmits a constant beaconing signal to announce or provide notification of its presence in an area. As illustrated in the bottom portion of FIG. 2, for example, to reduce the probability of the overlap and colliding of transmissions of multiple beacons, the transmissions 4 of the Host are separated from each other by a small, random delay, which is labeled as the spacing between the Tx. In response to beacon messages from the Host, the IoT device switches from the receive mode Rx to a transmit Tx mode to send data 1, 6 to the Host or simply resume its alternate transmit and receive intervals. The Host switches from the transmit mode Tx 6 to a receive mode Rx 3, 5 to receive data from the IoT device, and then returns to the transmit (Tx) (e.g., beaconing) mode.

In this Related Art embodiment of FIG. 2, the constant beaconing by the Host occupies bandwidth and airtime within a network, and the IoT devices in the network must operate in a semi-continuous receive Rx mode to ensure receipt of the beacon transmissions. As a result of operating in a semi-continuous receive mode, the IoT device consumes a lot of energy and/or battery power. During the Rx mode, the IoT device must digitize and inspect the output of its antenna in order to ascertain whether a message has been received. In general, although the receive mode consumes somewhat less power than the transmit mode, individual transmission events are several orders of magnitude shorter than the listening intervals for the IoT device. As such, 1-2 seconds of the IoT device in the receive mode consumes much more energy than a typical series of 1 millisecond transmissions in the transmit mode in which multiple packets of data may be transmitted. Accordingly, most (e.g., 90%) of an IoT device's energy budget for communications is consumed during operation in the receive mode.

Figure 3:
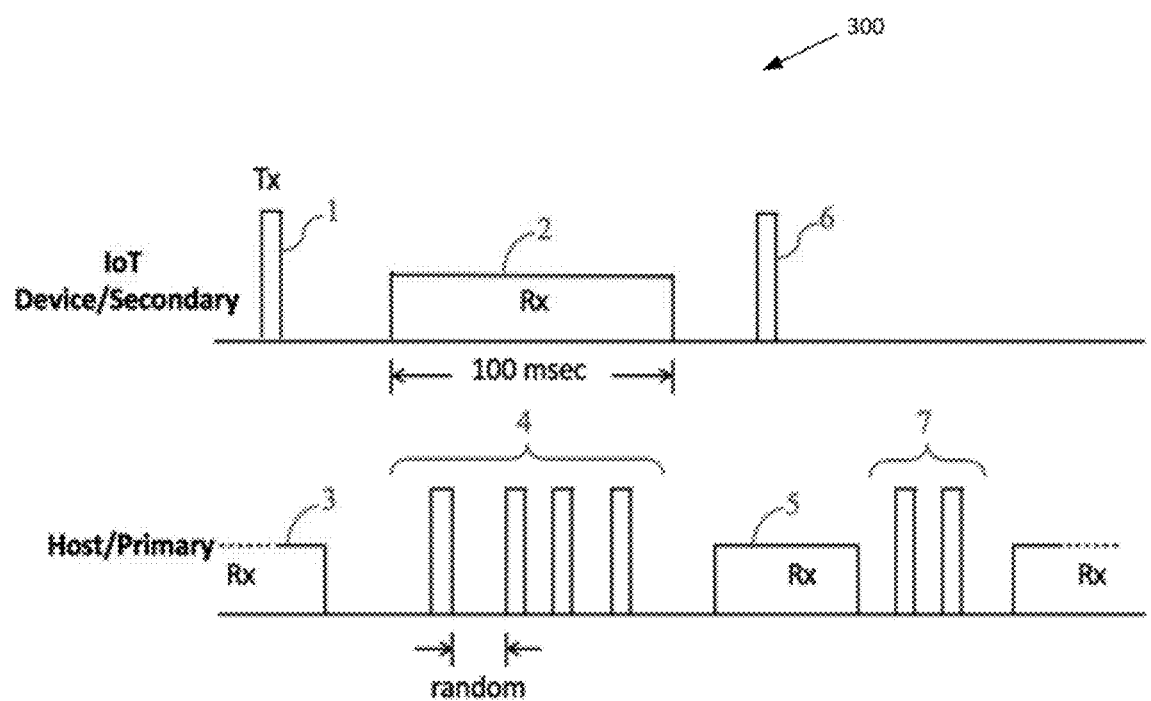
FIG. 3 shows an example of a timing diagram for a communication dialogue between an IoT type RF enabled device and Host/node type RF enabled device within a system, such as the example system of FIG. 1.

FIG. 3 illustrates an example of a timing diagram for a communication dialogue between an IoT device and Host/RF device within a system, such as the example system of FIG. 1.

In the timing diagram of FIG. 3, the upper portion represents the states of the communication dialogue of the IoT/Secondary device 121 illustrated in FIG. 1, and the lower portion represents the states of the communication dialogue of the Host/Primary device 134 illustrated in FIG. 1. Moving in a direction from left to right in the illustrated example of FIG. 3, the Host/Primary device 134 operates in a default receive Rx mode 3, and the IoT/Secondary device 121 operates in a default standby or sleep mode, during which time period the IoT/Secondary device is neither transmitting nor receiving; thus, the IoT/Secondary device uses minimal power. The IoT/Secondary device, at a time random with respect to the operation of the Host/Primary device or at the occurrence of an event, such as movement/motion of an item, changes in temperature, noise, ambient light, etc., operates briefly in transmit (Tx) mode 1 to broadcast, for example, a start dialogue message. The Start Dialogue message announces that the IoT/Secondary device 121 will, after a pause of a predetermined length, for example, 10-50 msec, transition from the Tx mode 1 to a receive Rx mode 2 for an interval of predetermined length, for example, 100 msec, to receive a message, i.e., one or more data packets, from the Host/Primary device 134. The Host/Primary device 134, having received the Start Dialogue message (in Tx 1) from the IoT/Secondary device 121, transitions from its default Rx mode 3 to a transmit Tx mode at 4. During the Tx mode 4, the Host/Primary device 134 may transmit to the IoT/Secondary device 134 one or more packets shown by way of example as a series of randomly-timed data packets. After the series of data packets has been transmitted by the Host/Primary device 134 to the IoT/Secondary device 121, the IoT/Secondary device 121 transitions to the standby or sleep mode, and the Host/Primary device 134 transitions back to the default receive Rx mode 5.

The IoT/Secondary device, if commanded by its own software or from the data received from the Host/Primary device, may transition, after a period of time, from the receive Rx mode to a transmit Tx mode 6 to, for example, acknowledge receipt of the data packet from the Host/Primary device or initiate another dialogue. After receiving any transmission message from the IoT/Secondary device, the Host/Primary device can transmit in mode 7 a number of data packets to, for example, other Host/Primary devices, gateway devices 137, fog gateway 130, or other receivers, via the network 133 of the system 100 in FIG. 1, to control the IoT device functions or to propagate messages through the network 133. Further, if the IoT/Secondary device receives defective or inadequate data during the receive Rx mode, the IoT/Secondary device may resend a Start Dialogue message to request the data packet be resent.

In the example of FIG. 3, the receive mode 2 for the IoT/Secondary device is much shorter than a receive mode of the Related Art of FIG. 2. The receive Rx mode of the IoT/Secondary device 121 of FIGS. 1 and 3 may be programmed to recur at specific intervals, for example, once every several seconds. At which time, the IoT/Secondary device 121 transitions from the standby or sleep mode to a transmit mode to transmit a Start Dialogue message, and then transitions to the receive Rx mode. In general, the IoT/Secondary devices 120 of system 100 enter the receive (Rx) mode for relatively short intervals that are initiated by each IoT/Secondary device 121 after having transmitted a Start Dialogue message. Thus, the IoT/Secondary device, instead of spending only a small percentage (e.g., 5%) of its time in the standby or sleep mode in comparison to the example of FIG. 2, will spend most of its time (e.g. 95%) in the standby or sleep mode, resulting in the IoT device spending more time in an energy-conserving and neutral mode rather than transmitting or receiving modes and consuming battery life. The actual percentages may vary from case to case based upon system specifics, operating mode, number and timing of the data transmissions required, etc. In general, operation of the IoT/Primary device as in the example of FIG. 3 and disclosed herein will significantly extend the battery life for IoT/Secondary devices when compared to the Related Art.

In an example of device communication dialogue not illustrated in FIG. 3, additional transmissions may occur between Host/Primary, IoT/Secondary, and other devices, and commands may be issued by computing devices comprised by the Primary, Secondary, or other devices that may modify the number, content, and timing of dialogue events. Data packets transmitted by IoT devices, beacons or Host/Primary devices, and potentially other devices in a system such as those disclosed herein, may include locally unique identifying numbers so that in every transmission, the transmitter identifies itself to the receiving devices. Systems 100 may comprise multiple Host/Primary devices 134 and multiple IoT/Secondary devices 120.

The above-described concept of dialogue management encompasses not only mobile-to-beacon (e.g., IoT device-to-Host device) exchanges, but also mobile-to-mobile and beacon-to-beacon exchanges. Also, the Host/Primary device may be a luminaire or a non-stationary device.

Figure 4:
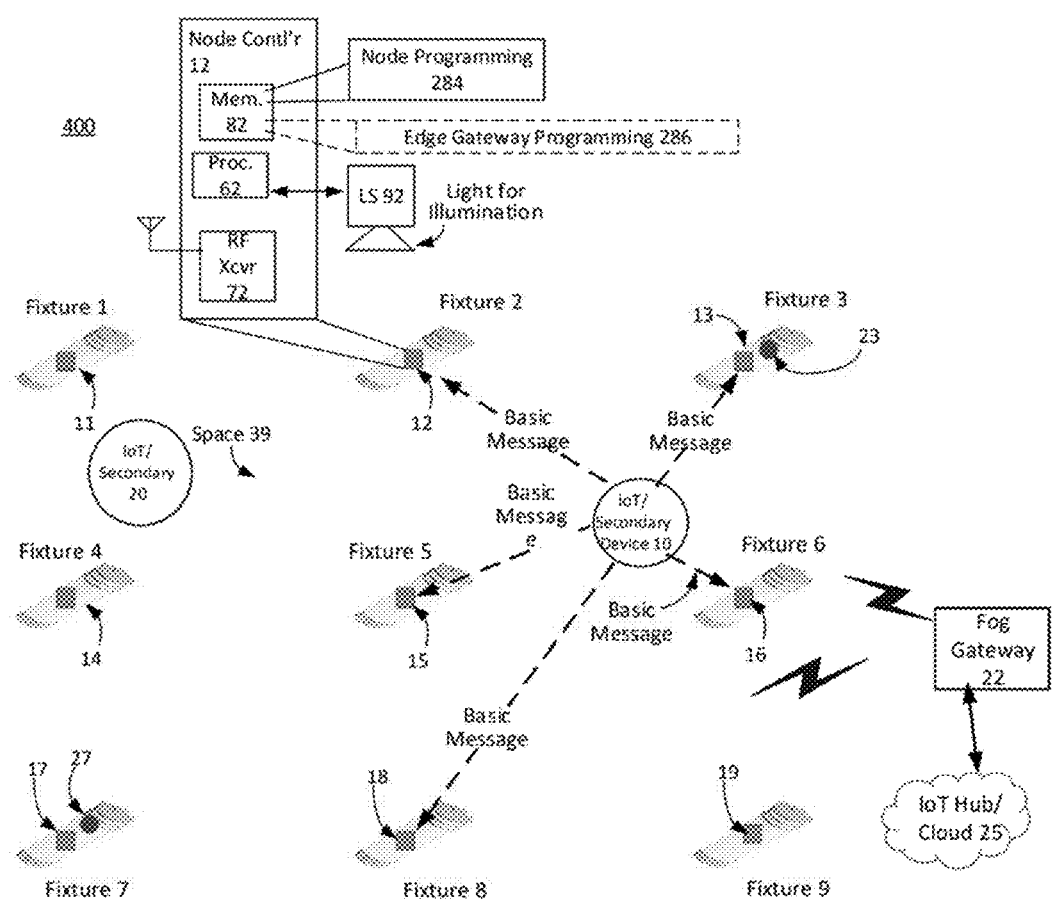
FIG. 4 depicts a simplistic system example of the functions performed by each of the system components, such as those described with reference to FIG. 1.

FIG. 4 depicts a simplistic system example of the functions performed by each of the system components, such as those described with reference to FIG. 1.

Similar to system 100, the simplistic system 400 of FIG. 4 includes a number of RF-enabled nodes implemented in light fixtures 1-9, a number of edge gateways 23 and 27 in light fixtures 3 and 7 respectively, and a fog gateway 22.

The several light fixtures 1-9 of the system 400 are arranged to provide general illumination within space 39, and are configured as RF-enabled wireless communication nodes in a network, such as 133 of FIG. 1. In an example, two of the light fixtures 3 and 7 also are configured as edge gateways. Each of the several fixtures 1-9 has a node controller 11-19, respectively. The respective node controllers 11-19 are configured to manage nodal communications with the edge gateways 23, 27 and the controller 22 of system 400. The respective node controllers 11-19 are also configured to communicate with the IoT devices 10 and 20. In a light fixture like 3 or 7 that also functions as an edge gateway 23, 27, the node controller may also control gateway related operations, e.g. receiving messages from nodes and transmitting messages to the fog gateway. The node controller 12 of light fixture 2 is shown in detail and is representative of the other node controllers 11 and 13-19. The node controller 12 may be coupled to a light source (LS) 92 that provides illumination to the space 39.

Some light fixtures serving only as nodal devices may have only a single radio frequency (RF) type wireless transceiver for the first frequency band and/or protocol; however, at least those light fixtures serving as edge gateways have transceiver systems for two bands and/or protocols, typically two RF wireless transceivers for the first and second bands and/or protocols, typically two RF wireless transceivers for the first and second bands and/or protocols. In some later examples, each RF network enabled light fixture has both a first transceiver (e.g. a Bluetooth low energy radio) and a second transceiver (e.g. a WiFi or sub-GHz radio), although some may serve as end nodes and only use the first type transceiver. In other examples, some light fixtures in an RF network may only have the first radio frequency transceiver while others comprise systems with both types of radio transceivers for the edge gateway functionality. In still other examples, some fixtures may have one or the other radio, while some number of other fixtures may have a combination of the two RF transceiver types, (e.g. some nodes have Bluetooth only, some have WiFi or Sub-GHz only, and edge gateways have both).

The node controller 12 may include a processor 62, at least one radio frequency transceiver (RF Xcvr) or transceiver system 72, and a memory 82. The memory 82 may include programming code that when executed by the processor configures the processor 62 to perform various functions. For example, memory 82 may store node programming 284 that when executed configures the node controller 12 of fixture 2 to perform functions typically performed by nodes 134 in the network 133 of RF-enabled wireless communication nodes 134 of FIG. 1. One purpose of the node 134 is to deliver data, including data obtained from received basic messages, to an edge gateway or to the IoT device via a first frequency band and/or protocol. Such node network functions are described in more detail below. In addition or alternatively, the memory 82 may store edge gateway programming 286. The edge gateway programming 286 when executed configures the node controller 12 to perform functions associated with an edge gateway 23 or 27. The edge gateways 23 or 27 may serve to translate messages received from node controllers 11-19 into communications suitable for exchange with the fog gateway 22. One purpose of the edge gateway is to deliver data, including aggregated message data obtained from the received node IoT messages, to and receive data from the fog gateway via a different frequency and/or protocol (e.g. WiFi or sub GHz PAN) to avoid interference/traffic from 2.4 GHz. In addition, sub GHz or WiFi radio frequency signals have a longer range than the 2.4 GHz signals (e.g. of BLE) to extend the coverage and distance between the edge gateways 23, 27 and the fog gateway 22. The functions of an edge gateway are described in more detail with reference to the example in FIG. 4 and other examples. The processor 62 may control the functions of the node within the network of RF-enabled wireless communication nodes.

Each of the light fixtures 1-9 may be assigned an identifier referred to as a node identifier in the network, and the node identifier may be stored in the respective memory of the respective node controller 11-19. For example, the node identifier of fixture 2 may be stored in the memory 82. Each light fixture processor, such as 62 of fixture 2, may, for example, be configured to control the light source (e.g. 92) and the RF transceiver (e.g., 72), and process signals and messages received from IoT devices, such as 10, within space 39, the edge gateways 23 and 27, and the fog gateway 22. For example, the node controller 12 may deliver control commands to the light source (LS) 92 of the light fixture and provide light source status information (e.g., temperature, ON duration and the like) to the fog gateway 22. Each radio frequency transceiver of respective node controllers 11-19 may be configured to receive and transmit signals within a first frequency band. For example, the radio frequency transceivers may be a Bluetooth transceiver, such as a Bluetooth Low Energy (BLE) transceiver that is configured to operate according to the Bluetooth communication protocol and transmit and receive RF signals at a frequency of approximately 2.4 GHz.

In the example of FIG. 4, the RF transceivers of the respective light fixtures 1-9 may be configured to communicate with a RF transceiver of IoT/Secondary devices, such as IoT device 10, within the space 39.

As shown in FIG. 4, the edge gateways of the system 400 may be colocated with one or more lighting fixtures in the space 39. For example, the edge gateways 23 and 27 are collocated with Fixture 3 and Fixture 7, respectively, of system 400. The edge gateways 23 and 27 may be configured to operate in the first frequency band compatible with the node radio frequency transceiver. For example, the edge gateways 23 and 27 may include a BLE transceiver that performs additional processing of signals or messages received from the RF transceiver of a node controller, such as node controller 13 of fixture 3, an also process signals received from IoT devices 10 and 20. As an alternative to including the additional edge gateway programming 286, the edge gateway 23, 27 may be a system-on-a-chip (SOC) that provides all of the components (e.g., processor, memory, RF transceiver) of an edge gateway and receives power from a component of the light fixture such as a driver of the light source or the like. For example, using the edge gateway SOC configuration, nearly any of fixtures 1, 4-6, 8 or 9 may also be configured to provide the edge gateway functions in addition to fixtures 2, 3 and 7 that may be programmed or are already configured as edge gateways.

The fog gateway 22 may be configured for wireless data communication with the edge gateways 23 and 27. For example, the fog gateway 22 may be configured with a radio frequency transceiver (not shown) that is compatible with the radio frequency transceiver in any of the light fixtures 1-9 that utilizes the second frequency band and/or protocol.

In an alternative example, the edge gateways 23 and 27 may be equipped with a first RF transceiver system (e.g. one or more transceivers) configured to transmit and receive signals of a first frequency band and configured to receive and transmit signals in a second frequency band different from the first frequency band. For example, a first RF transceiver may be one of a Bluetooth transceiver, a Zigbee transceiver, a radio frequency identifier (RFID) transceiver, PAN transceiver or a Wi-Fi transceiver. The first RF transceiver may also be configured to operate within a first frequency band that may include 2.4 GHz or the like. At least in the edge gateways, the transceiver system may have a second transceiver configured to receive and transmit signals in the second frequency band, which may be in in the sub-GHz range, such as, for example, 900 MHz or the like. In some examples, the first RF transceiver is a Bluetooth Low Energy (BLE) transceiver and the second transceiver is a 900 MHz personal area network (PAN) protocol type transceiver, although a WiFi or other transceiver may be utilized as the second transceiver. Depending on the type of WiFi, e.g. 2G or 5G, the Wi-Fi second frequency band may overlap with the BLE first frequency band. For example, Bluetooth signals use frequencies between 2.4000 GHz and 2.4836 GHz (the "2.4 GHz band"), while some iterations of WiFi communicate broadcast signals using frequencies in three 22-MHz-wide sub-bands spaced out within the 2.4 GHz band (2G protocol), which results in some overlap. Other iterations of the WiFi protocol call for operation in a 5 GHZ (or 5G) band ranging from 5.725 GHz to 5.875 GHz, which would be totally separate from the 2.4 GHz band used by Bluetooth.

In FIG. 4, the IoT/Secondary device 10 is shown transmitting a basic message or a Start Dialogue message. The basic message may include an identifier of the IoT device and a basic message sequence number. The IoT device identifier (ID) in the basic message may be, for example, a 6 byte IoT ID that is unique to IoT device 10, at least with respect to IoT devices used for tracking in the space 39. In one example, however, the IoT device identifier (ID) may be a media access control (MAC) address of the BLE transceiver, which may be guaranteed to be globally unique by the BLE chip vendor. In a specific example, the basic message sequence number may be, for example, a 4 byte sequence number, which ensures that the sequence number will not repeat for a number of years. The number of years until a sequence number repeats is estimated to be almost 450 years.

The IoT/Secondary device 10 located in space 39 may transmit the Start Dialogue or basic message into the space 39 in response to an occurrence of an event or stimulus detected by the IoT device 10. The occurrence of the event causes the IoT device to transition from a standby mode to a transmit mode to send the Start Dialogue message into the space 39 of the network of nodes 134. For example, an event may be a change of a counter value to a predetermined value, a timing event, receipt of an input signal from an external source, or the like. A detected stimulus may be, for example, a specific temperature, a movement, a noise above a certain level or for a predetermined duration, ambient light above a certain level, receipt of a particular signal or message from an RF enabled node, or the like.

The IoT device 10 transmits the Start Dialogue or basic message into the space 39 without any intended nodal recipient. In this respect, the transmitted message may be viewed as a beacon signal meant to inform any of light fixtures 1-9 in the space of the identity of the IoT device 10, and pause for a time period to permit the light fixture 1-9 to transition from a receive mode to a transmit mode, and to permit the IoT device to transition to a receive mode to receive an associated message sequence or data packet from the light fixture. For ease of discussion and illustration, only one Start Dialogue or basic message is shown in FIG. 4 being transmitted by the IoT device 10. However, it is envisioned that in some examples the IoT device 10 may transmit a Start Dialogue or basic message approximately upon the occurrence of an event, or at a preset counter value, such as 10,000 or the like. The IoT device operates in a receive mode, for example, for a duration of 1-2 seconds. As such, the IoT device remains in a neutral or standby mode (e.g. no constant transmit mode) until the occurrence of the event. Whenever the IoT device 10 transmits a basic message, the basic message sequence number of the transmitted basic message is incremented from the previous basic message sequence number in the basic message transmitted immediately prior to the latest transmitted basic message. For example, at counter value C=12000, IoT device 10 may send a basic message with its tag ID (e.g. XYZ) and sequence number (e.g., 100), and, at counter value C=24000, IoT device 10 may send a basic message with its device ID XYZ and a incremented sequence number, such as 101. For convenience in this simple example, the IoT device 20 is not transmitting any basic messages or other signals at this time.

Returning to FIG. 4, the Start Dialogue or basic message transmitted by the IoT device 10 may be received at three or more of the wireless communications nodes distributed about the space 39. In the example of FIG. 4, lighting fixtures 2, 3, 5, 6 and 8 of the light fixtures 1-9 receive the Start Dialogue or basic message transmitted by the IoT device 10. RF transceivers (e.g. of the first type) in the lighting fixtures 1-9 may be configured to each measure a signal attribute of any received basic message, which in this example is the message transmitted by the IoT device 10. In this example, each of the three or more wireless communication nodes (i.e., lighting fixtures 2, 3, 5, and 8) measure a signal attribute of the received basic message. A signal attribute of the received signal may include the received signal strength (RSS), angle of arrival (AoA), or the like. For purposes of discussion of a particular example, the received signal strength (RSS) may be measured and indicated by a value referred to as the received signal strength indicator (RSSI). Each of the RF transceivers in the RF-enabled nodes 11-19 in such an example may be configured to output an RSSI corresponding to any received basic message signal to the light fixture processor (not shown in this example). The light fixture processor may control the light source and the light fixture RF transceiver, and may be configured to process the basic message signals received from the asset tracking tag 10 as well as the RSSI values output by the RF transceiver in the particular node.

In the example of FIG. 4, the light fixtures 1-9 form a network of RF-enabled wireless communication nodes, such as network 133 of FIG. 1. In a specific example, the network formed from light fixture 1-9 nodes may be referred to as a flooding network. Messages in the flooding network topology have a time to live (TTL). The TTL may be a set period of time, a set number of hops, or the like. The TTL may also be a configuration setting of how individual nodes are supposed to respond in response to receiving a message. For example, a node processor may be configured to upon receipt of a message to lookup in a memory an identifier of the message, such as a IoT device ID and basic message sequence number. If the message identifier has been received previously, the node may discard the received message. Alternatively, if the node does not have the message identifier stored in memory, the node processor stores the message identifier and may send a node specific message to the RF transceiver of the node for transmission into the space 39.

The RF-enabled nodes 134 of FIGS. 1 and 2 are illustrated as lighting devices or light fixtures. The term "lighting device," as used herein, is intended to encompass essentially any type of device that processes energy to generate or supply artificial light, for example, for general illumination of a space intended for use of occupancy or observation, typically by a living organism that can take advantage of or be affected in some desired manner by the light emitted from the device. A lighting device, for example, may take the form of a lamp, light fixture or other device that incorporates a source, where the source by itself contains no intelligence or communication capability (e.g. LEDs or the like, or lamp ("regular light bulbs") of any suitable type) and an associated modulator and logic circuitry. Alternatively, a light fixture may be relatively dumb but include a source device (e.g. a "light bulb"). Lighting devices, such as light fixtures, floor or table lamps, or other types of devices for artificial general illumination are widely used in various residential, commercial and industrial setting for providing illumination in both interior and exterior spaces. For example, a retail store may install multiple luminaires in the ceiling for illuminating products and walking area throughout an indoor area, such as a store. Additionally, a lighting device may provide light for use by automated equipment, such as sensors/monitors, robots, etc. that may occupy or observe the illuminated space, instead of or in addition to light provided for an organism. However, it is also possible that one or more luminaires in or on a particular premises have other lighting purposes, such as signage for an entrance or to indicate an exit. In most examples, the lighting devices illuminate a space or area of a premises to a level useful for a human in or passing through the space, e.g. general illumination of a room or corridor in a building or of an outdoor space such as a street, sidewalk, parking lot or performance venue. The actual source of illumination light in or supplying the light for a lighting device may be any type of artificial light emitting device, several examples of which are included in the discussions below.

Light output from the lighting device may carry information, such as a code (e.g. to identify the luminaire or its location) or downstream transmission of communication signaling and/or user data. The light based data transmission may involve modulation or otherwise adjusting parameters (e.g. intensity, color characteristic or distribution) of the illumination light output from the device.

Figure 5:
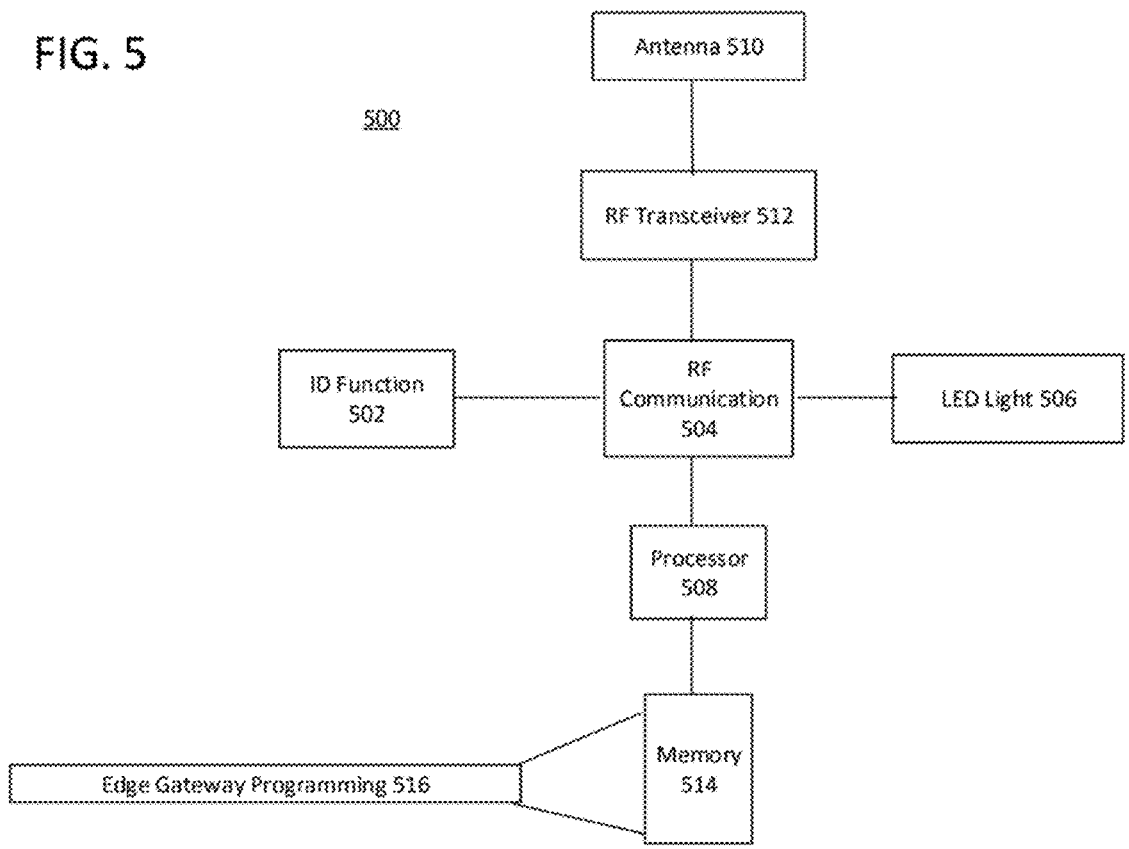
FIG. 5 depicts logical, functional, and structural features of a radio frequency communication enabled light fixture suitable for use as a node, e.g. in a network of RF-enabled wireless communication nodes.

FIG. 5 depicts logical, functional, and structural features of a radio frequency (RF) communication enabled light fixture suitable for use as a node, e.g. in a network of RF-enabled wireless communication nodes.

In the example of FIG. 5, a radio frequency wireless communication enabled light fixture 500 is suitable for use as an RF-enabled node in a network of RF-enabled wireless communication nodes. The light fixture 500 may include a processor 508, a memory 514, an LED type light source 506, an RF transceiver system 512, an antenna 510, and one or more sensors (not shown). The light fixture 500 may implement an ID function 502 that may handle functionality related to determining the node identifier (NID) for a IoT/Secondary message and/or a gateway identifier for an aggregated message if the fixture serves as a gateway such as edge gateway 23, 27 in FIG. 4. The light fixture 500 may implement RF communication transceiver system features 504 for communicating over the RF radio band(s) with RF-enabled IoT/Secondary device and/or with other fixtures, such as fixture 3 of FIG. 4, with edge gateways 23 and 27, with lighting system controllers (not shown), and/or with RF enabled IoT devices. The memory 514 may be used for program storage (e.g. to implement processor control of the communication functions 504), data storage, and the like. In an example, node or gateway ID data that may be used by ID function 502 also may be stored in the memory 514. In yet another example, data and other information received via the RF transceiver (TX/RX) 512 may be stored in the memory 514. The memory 514 may store for example, basic messages received from IoT/Secondary devices, lighting control information, IoT device information, time-to-live information of nodal communications, or the like.

An RF-enabled light fixture 500, such as the one depicted in FIG. 5, may facilitate Bluetooth transmission and/or WiFi or sub-GHz for basic message processing, IoT device message generation, aggregated message generation and other messaging as described herein. Communication and device dialogue management is one particular example of an application for such an RF-enabled light fixture 500.

In an example, RF communication between the RF capability of the light fixture 500 and nearby IoT/Secondary devices may facilitate enhanced communication and device dialogue management, as will be described herein. Another exemplary capability of the light fixture 500, the IoT/Secondary devices, edge gateways and fog gateway is bi-directional communication. Bi-directional RF communication allows the exchange of software updates, firmware updates, identifier updates, commissioning information, edge gateway location messages, edge gateway status messages, IoT/Secondary device status updates, lighting commands and the like to be received/transmitted, for example, from/to the fog gateway to the respective devices collocated with (e.g., edge gateways, light sources) or in communication with the light fixture 500 (e.g., IoT/Secondary device or the like).

RF communication capabilities typically comply with some network-like standard, such as Bluetooth, sub-GHz PAN, WiFi, Zigbee or the like. As an example, a Bluetooth network standard includes unique identifiers for each Bluetooth device that is connected to a network. In a similar way, each RF enabled light fixture 500 in the network may be configured with a unique node identifier (e.g. NID and/or a gateway ID). As explained above, the NIDs may be used when determining a position of an asset tracking tag within a space.

It is also envisioned that to further reduce network traffic and interference in some of the frequency bands used in the system, for example, the 2.4 GHz range commonly associated with Bluetooth, the edge gateway may be configured to utilize a different frequency band. For example, in addition to a 2.4 GHz radio frequency transceiver the edge gateway may be equipped with a different radio frequency transceiver, such as a sub-GHz radio frequency transceiver or a 5G WiFi transceiver. The fog gateway may also be configured with a sub-GHz RF transceiver or a 5G WiFi transceiver in order to facilitate communication with the edge gateways, such as 23 and 27 of FIG. 4.

Figure 6A:
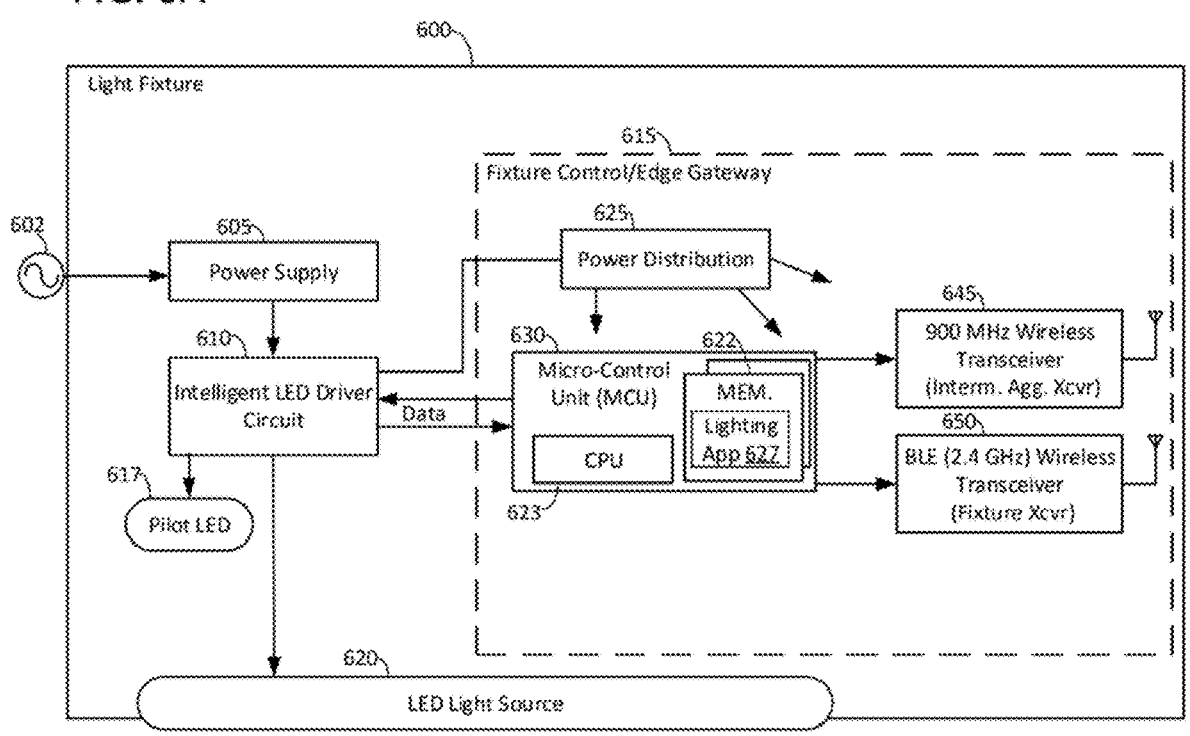
FIGS. 6A, 6B, and 6C depict logical, functional, and structural features of several examples of a radio frequency communication enabled light fixture suitable for use as a node and/or an edge gateway in a network of RF-enable wireless communication nodes.
Figure 6B:
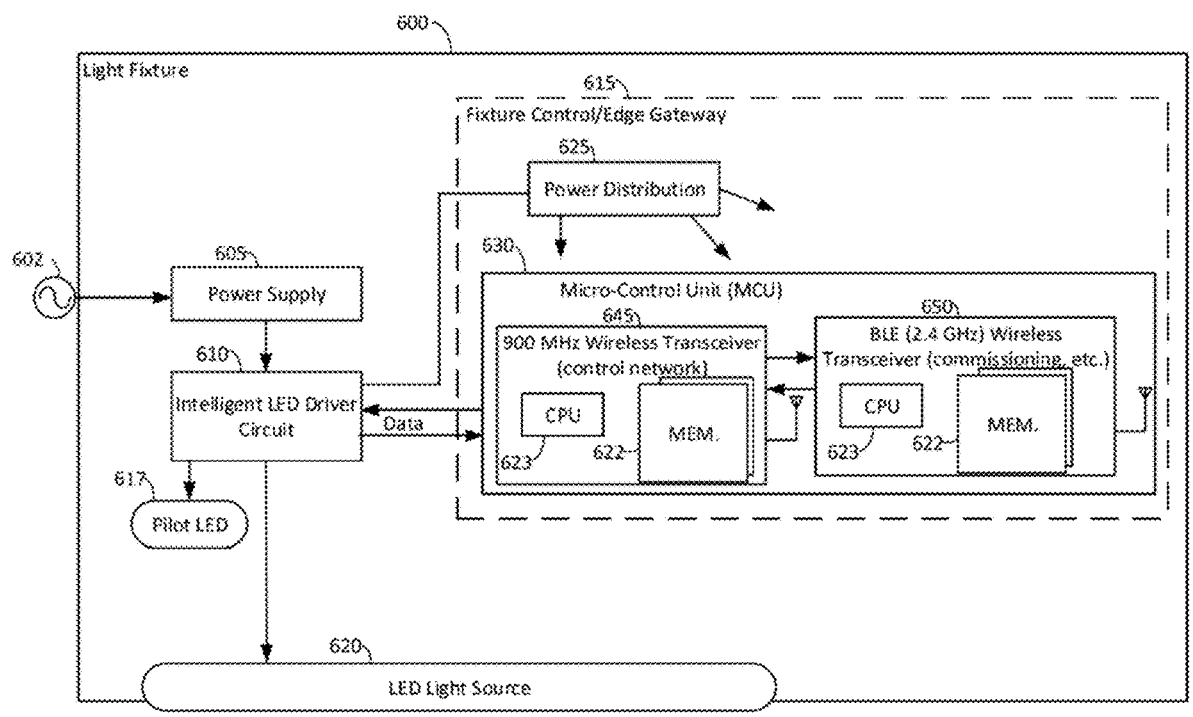
Figure 6C:
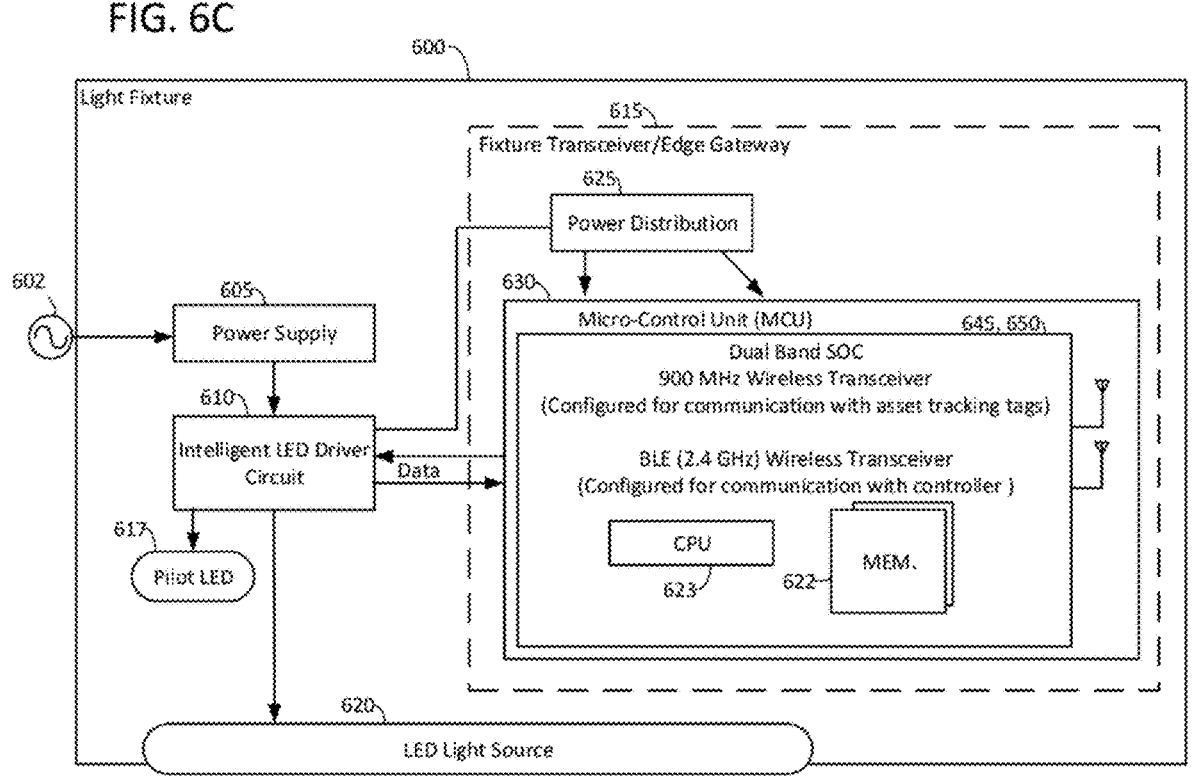

FIGS. 6A, 6B, and 6C depict logical, functional, and structural features of several examples of a radio frequency communication enabled light fixture suitable for use as a node and/or an edge gateway in a network of RF-enabled wireless communication nodes.

The block diagrams of FIGS. 6A-6C provide different examples of a light fixture 600 that communicates as an RF-enabled node within the network of RF-enabled wireless communication nodes with IoT-type devices of FIG. 1. Each example of the light fixture 600 includes a variation of a radio frequency transceiver system configured to communicate via a first frequency band and a second frequency band, so that the light fixture may function as an edge gateway instead or in addition to functioning as an RF-enabled end node type device. For purposes of further discussion, however, it generally is assumed that the light fixture 600 is configured as an edge gateway unless there is specific reference to an end node function being performed at the fixture 600.

In the examples of FIGS. 6A-6C, the light fixture 600 is an integrated light fixture that generally includes a power supply 605 driven by a power source 602. Power supply 305 receives power from the power source 300, such as an AC mains, battery, solar panel, or any other AC or DC source. Power supply 305 may include a magnetic transformer, electronic transformer, switching converter, rectifier, or any other similar type of circuit to convert an input power signal into a power signal suitable for light fixture 10

In all three examples, the light fixture 600 is an integrated light fixture that generally includes a power supply 605 driven by a power source 602. Power supply 605 receives power from the power source 602, such as an AC mains, battery, solar panel, or any other AC or DC source. Power supply 605 may include a magnetic transformer, electronic transformer, switching converter, rectifier, or any other similar type of circuit to convert an input power signal into a power signal suitable for light fixture 600.

Light fixture 600 furthers includes an intelligent LED driver circuit 610, fixture control/edge gateway 615, and a light emitting diode (LED) light source 620. Intelligent LED driver circuit 610 is coupled to LED light source 620 and drives that LED light source 620 by regulating the power to LED light source 620 by providing a constant quantity or power to LED light source 620 as its electrical properties change with temperature, for example. The intelligent LED driver circuit 610 includes a driver circuit that provides power to LED light source 620 and a pilot LED 617. Intelligent LED driver circuit 610 may be a constant-voltage driver, constant-current driver, or AC LED driver type circuit that provides dimming through a pulse width modulation circuit and may have many channels for separate control of different LEDs or LED arrays. An example of a commercially available intelligent LED driver circuit 610 is manufactured, for example, by EldoLED.

LED driver circuit 610 can further include an AC or DC current source or voltage source, a regulator, an amplifier (such as a linear amplifier or switching amplifier), a buck, boost, or buck/boost converter, or any other similar type of circuit or component. LED driver circuit 610 outputs a variable voltage or current to the LED light source 620 that may include a DC offset, such that its average value is nonzero, and/or an AC voltage. The pilot LED 617 indicates the state of the light fixture 600, for example, during commissioning and maintenance process. The example light fixture 600 is line powered and remains operational as long as power is available.

Fixture control/edge gateway 615 includes power distribution circuitry 625, a micro-control unit (MCU) 630, and wireless transceivers 645, 650. As shown, MCU 630 is coupled to LED driver circuit 610 and controls the light source operation of the LED light source 620. MCU 630 includes a memory 622 (volatile and non-volatile) and a central processing unit (CPU) 623. The memory 622 includes a lighting application 627 (which can be firmware) for lighting control operations, commissioning, maintenance, and diagnostic operations and for controlling communications and/or data processing related to the IoT/Secondary device functions of the lighting system. The power distribution circuitry 625 distributes power and ground voltages to the MCU 630, and wireless transceivers 345 and 350 to provide reliable operation of the various circuitry on the fixture control/edge gateway 615 chip.

In the examples of FIGS. 6A-C, light fixture 600 also includes a dual-band wireless radio communication transceiver system configured for two way wireless communication. It should be understood that "dual-band" means communications over two different RF bands and/or protocols. In these illustrated examples, the two bands are separated in the RF spectrum. For example, a radio frequency transceiver system may be configured to transmit and receive signals in a second frequency band for some purpose(s) (e.g. fog gateway communication) that is different from the first frequency band. In some examples, each of the edge gateways may be configured to transmit the aggregated message via radio frequency transceiver assigned to lighting system control, which for tracking purpose at least includes transmissions for receipt by the fog gateway, such as fog gateway 22 of FIG. 4. The communication over the two separate RF bands can occur simultaneously (concurrently); however, it should be understood that the communication over the two separate RF bands may not actually occur simultaneously. In the examples of FIGS. 6A and 6B, light fixture 600 has a radio set that includes an RF transceiver 645 for sub-GHz communications (also referred to as the system control RF transceiver) and an RF transceiver 650 for Bluetooth RF communications. The transceiver 645, such as a 900 MHz wireless transceiver, may issue control instructions for lighting control via a nodal network (e.g., the network of RF-enabled wireless communication nodes, such as 133 of FIG. 1). This transceiver 645, for example, may be used for wireless communication over one RF range with other light fixtures for lighting control purposes and for general IoT device communication management both via the nodal network. Two transport methods may be used via the network layer function of the transceiver 645: unicast and multicast. The transceiver 645 engages in multicast group communication of a one-to-many (e.g. a flooding network protocol) or a many-to-many distribution where group communication is addressed to a group simultaneously (e.g. multiple fixtures commonly assigned to function together, such as fixture 1, 5 and 9, or a group of IoT/Secondary devices, such as 10 and 20, of FIG. 4).

Another type transceiver 650, such as a 2.4 GHz BLE (Bluetooth) wireless transceiver receives commands from the fog gateway and/or a commissioning device such as a user terminal (not shown in this example), which relate to commissioning, maintenance, and diagnostics of the lighting fixtures. This second transceiver 650 is for point-to-point communication between the edge gateway and the fog gateway, over a second of the two different RF frequency bands (i.e. wireless communication bands), of information (such as aggregated messages in the IoT device communication dialogue management as explained with reference to FIGS. 1, and 3-4). In addition, the second transceiver 650 may receive from the fog gateway control and systems operations information, concurrently with at least some communications over the first wireless communication band of the first transceiver 645. In other configurations, BLE could be used for communications between RF enabled nodes 134 and edge gateways 137; and WiFi or the 900 MHz wireless band/protocol could be utilized for communications of the edge gateways 137 with the fog gateway 130.

In an alternate implementation, the first transceiver used for communications with other fixtures within range for commands or the like related to lighting operations may be a 2.4 GHz BLE (Bluetooth) wireless transceiver and the second transceiver for communication with the fog gateway may be a different type of transceiver, such as a WiFi wireless transceiver.

As shown, the MCU 630 includes programming in the memory 622 which configures the CPU (processor) 623 to control operations of the respective light fixture 600, including the communications over the two different wireless communication bands via the dual-band wireless radio communication interface system 645, 650. The programming in the memory 622 includes firmware/software that enables various light fixture operations, and includes operations related to the IoT/Secondary device communication as well as commissioning and maintenance of the light fixture via a lighting system fog gateway, such as 130 or 22 of FIGS. 1 and 4, respectively. The programming in the memory 622 may, for example, enable the processor 623 to carry out lighting control operations over the system 100 via the network of RF-enabled wireless communication nodes of FIG. 1, or the system 400 of FIG. 4.

Three different CPU and memory architectures are shown for the fixture control/edge gateway 615 and the MCU 630 of the light fixture 600 in FIGS. 6A-6C; and FIG. 6C shows a fixture configuration using a dual band wireless transceiver system (that generally implements communications functions similar to the transceivers 645, 650). In FIG. 6A, in addition to the memory 622 and the CPU 623 of the MCU 630 itself, the first transceiver 645 and the second transceiver 650 each include a separate memory (not shown) and a processor (not shown).

In FIG. 6B, the MCU 630 itself does not include a separate memory 622 and a CPU 623. Instead, only the first transceiver 645 and the second transceiver 650 each include a separate memory 622 and a processor 623. For efficiency purposes, such as to save manufacturing costs and conserve power (e.g., line power or battery power), the memory 622 and CPU 623 of the first transceiver 645 is selected to perform processing because the majority of processing (normal lighting control operations) occur over the sub-GHz wireless control network. Hence, in the example of FIG. 6B, the fixture control module 615 includes a total of two processors and two sets of memory.

In FIG. 6C, the MCU 630 comprises the dual band RF transceiver on chip (SOC) 645, 650; and the MCU 630 itself does not include a separate memory 622 and a CPU 623. Instead, the first transceiver function and the second transceiver function are integrated and combined into the chipset with the MCU 630. Hence, in the example of FIG. 6C, the fixture control/edge gateway 615 includes a total of one processor and one set of memory. Integrating the first transceiver function and second transceiver function into a dual band SOC chipset with the MCU 630, which saves manufacturing costs and conserves power (e.g., line power or battery power).

Operationally, the process described with respect to FIG. 4 remains substantially the same when the edge gateway is configured with the first RF transceiver and the second RF transceiver or the dual band transceiver. For example, the processor 623 of FIGS. 6A-6C may convert some number of the node IoT device messages generated in response to receipt of the Start Dialogue or basic messages at various of the RF enabled nodes from an IoT/Secondary device, according to protocol, into a data packet suitable for transmission via the second RF transceiver as an aggregated message, or other type of message, such as a status message, control signal acknowledgement or the like. Conversely, the processor 623 of FIGS. 6A-6C may be configured to receive signals via the second RF transceiver and convert the received signals according to a protocol into data packets suitable for transmission via the first RF transceiver to, for example, either the IoT devices or to RF enabled nodes implemented in other fixtures.

Figure 8:
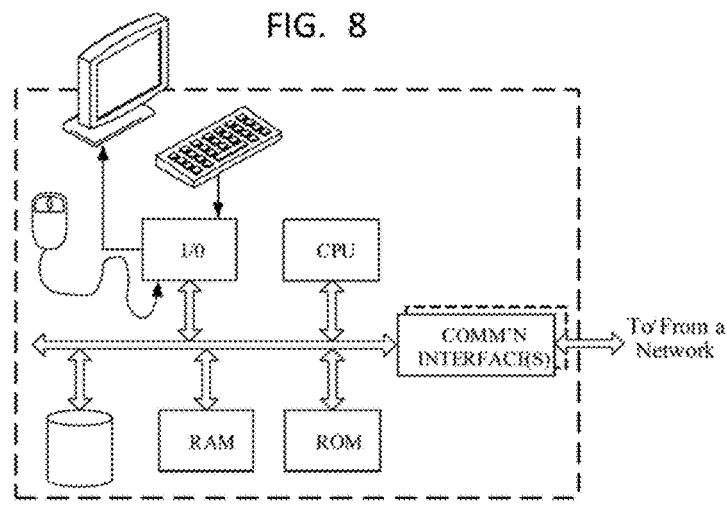
FIG. 8 is a simplified functional block diagram of a personal computer or other work station or terminal device usable for dialogue management and/or receiving dialogue information related to an IoT device in the example of FIG. 1.
Figure 7:
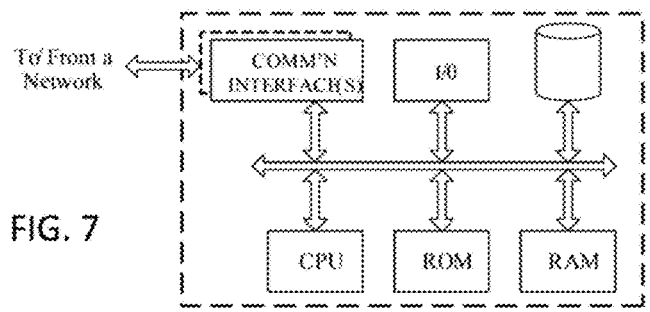
FIG. 7 is a simplified functional block diagram of a computer that may be configured as a host or server, for example, to function as a server for the dialogue management in the IoT hub/cloud included in the example of FIG. 1.

FIGS. 7 and 8 provide functional block diagram illustrations of general purpose computer hardware platforms. FIG. 7 illustrates a network or host computer platform, as may typically be used to implement a server, although such a platform configured with the appropriate communication interfaces also may serve as a fog gateway. FIG. 8 depicts a computer with user interface elements, as may be used to implement a personal computer or other type of work station or terminal device, although the computer of FIG. 8 may also act as a server or gateway if appropriately programmed. It is believed that those skilled in the art are familiar with the structure, programming and general operation of such computer equipment and as a result the drawings should be self-explanatory.

Hardware of a server computer, for example (FIG. 7), includes one or more data communication interfaces for packet data communication over wireless, wired or optical fiber links. The server computer also includes a central processing unit (CPU), in the form of circuitry forming one or more processors, for executing program instructions. The server platform hardware typically includes an internal communication bus, program and/or data storage for various programs and data files to be processed and/or communicated by the server computer, although the server computer often receives programming and data via network communications. The hardware elements, operating systems and programming languages of such server computers are conventional in nature, and it is presumed that those skilled in the art are adequately familiar therewith. Of course, the server functions may be implemented in a distributed fashion on a number of similar hardware platforms, for example, to distribute the processing load.

Figure 9:
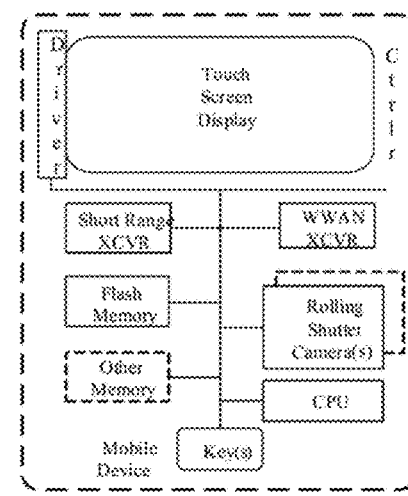
FIG. 9 is a simplified functional block diagram of a mobile device usable for executing dialogue management applications and/or receiving dialogue information related to an IoT device in the example of FIG. 1.

FIG. 8 depicts a computer with user interface elements, as may be used to implement a portable device or other type of work station or terminal device, although the computer of FIG. 8 may also act as a server if appropriately programmed. Hardware of a computer type user terminal device, such as a PC or tablet computer, may include a data communication interface, CPU, main memory and one or more mass storage devices for storing user data and the various executable programs (see FIG. 8). A mobile device (FIG. 9) type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphone type mobile devices include similar but smaller input and output elements. Tablets and other types of smartphone type mobile devices utilize touch sensitive display screens, instead of separate keyboard and cursor control elements. In the example (FIG. 9), the mobile device may be configured to receive the asset tag location estimate for presentation of the estimated location to a user via a touch screen display of the mobile device. The hardware elements, operating systems and programming languages of such user terminal devices also are conventional in nature, and it is presumed that those skilled in the art are adequately familiar therewith.

Hence, aspects of receiving signals from one or more IoT devices, processing the received signals through RF-enabled nodes and gateways, and managing device communications in a space as outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the programming and/or the relevant data. All or portions of the programming and/or the relevant data may at times be communicated through the Internet, telecommunication networks, or various other data networks. Such communications, for example, may enable loading of the programming and/or the database from one computer or processor into another, for example, from a management server or host computer of an enterprise location, or more generally, the location determination or estimation service provider into the computer platform and on-line to perform the relevant tuple generation or location functions in an actual working environment. Thus, another type of media that may bear the programming elements and data includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

In a processing example using in part a node identifier tuple, each of the plurality of radio frequency-enabled wireless communication nodes may be configured to receive a basic message transmitted by an IoT device located in the space, and measure a signal attribute of the received basic message. The measured signal attribute may be associated (e.g. in a node memory) with a node identifier of the respective node that made the signal attribute measurement. The basic message includes an identifier of the IoT device and may include a basic message sequence number. Each radio frequency-enabled wireless communication node may be configured to transmit a node asset message to an edge gateway. The node asset message includes the IoT device identifier, the basic message sequence number (if provided), a node identifier of the respective wireless communication node transmitting the respective node message, and the measure signal attribute of the basic message measured by the respective wireless communication node that is transmitting the respective node asset message.

Edge gateways may be configured to receive the respective transmitted node message transmitted by each of the three or more wireless communication nodes. Each edge gateway that receives such node messages may determine respective node identifiers of a number of respective nodes nearest to the IoT device, based on the measured signal attribute of the basic message included in each respective node message or data packet.

An aggregated message may be forwarded from each edge gateway to the fog gateway. Each aggregated message may include the IoT identifier, the basic message sequence number (if provided), and a list of the node identifiers associated with a respective one of the highest measured signal attribute values.

The fog gateway may be configured to receive a respective aggregated message from each of the edge gateways. A tuple, or ordered list, may be generated or formed containing the ranked respective node identifiers along with the IoT identifier, the basic message sequence number (if provided), and possibly the measured signal attribute values. The tuple, for example, may be as simple as a list of three or more node identifiers for nodes having reported respective highest measure signal attribute values.

The computing device, e.g. at or coupled to the fog gateway, may be configured to determine, based on the generated tuple and the specific node locations associated with the node identifiers in the tuple, that the IoT device is located, for example, within a region in which the vertices of the region are the specific node locations of the nodes indicated by the node identifiers in the tuple.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed:

1. A system, comprising:
   a plurality of radio frequency-enabled nodes networked to communicate in an area, wherein each respective node is configured to operate in a default receive mode, transition to a transmit mode to transmit a radio frequency signal for a predetermined period, and upon completion of the transmission of the radio frequency signal, immediately transition back to the default receive mode to await receipt of a signal to indicate a time for another transmission; and
   a radio frequency-enabled device configured to operate in a default standby mode and communicate with one or more of the radio frequency-enabled nodes, the radio frequency-enabled device comprising:
      a radio frequency transceiver; and
      a processing device configured, upon execution of instructions maintained in firmware, to:
         in response to expiration of a time period or an occurrence of an event, transition from the standby mode to a transmit mode;
         in the transmit mode, broadcast a start dialogue message including timing information to initiate communication with the one or more radio frequency-enabled nodes;
         after a pause of a predetermined length defined in the start dialogue message, transition to a receive mode to receive a data packet transmitted from one or more of the radio frequency-enabled nodes, wherein a predetermined period for the transmission of the data packet from the one or more radio frequency-enabled nodes to the radio frequency-enabled device is defined by the radio frequency-enabled device, wherein the receive mode for the radio frequency-enabled device is initiated after the radio frequency-enabled device broadcasts the start dialogue message, and wherein the transition of the one or more radio frequency-enabled nodes from the default receive mode to the transmit mode occurs based only upon receipt of the start dialogue message from the radio frequency-enabled device; and upon completion of receiving the data packet from the one or more radio frequency-enabled nodes, immediately transition from the receive mode to the default standby mode.

2. The system of claim 1, wherein the start dialogue message includes identifying information of the radio frequency-enabled device.

3. The system of claim 1, wherein:
the data packet is transmitted during the transmit mode of the one or more radio frequency-enabled nodes.

4. The system of claim 3, wherein the one or more radio frequency-enabled nodes is configured to transition from the transmit mode to the default receive mode upon the completion of transmission of the data packet to the radio frequency-enabled device.

5. The system of claim 1, wherein the receive mode of the radio frequency-enabled device has a duration of at least 100 milliseconds.

6. The system of claim 1, wherein the pause of the predetermined length is at least 10 milliseconds.

7. The system of claim 1, wherein the radio frequency-enabled device is at least one of a smart tag, an internet of things (IoT) device, or a mobile device.

8. The system of claim 7, wherein the IoT device is at least one of a smart tag or a mobile device.

9. The system of claim 1, wherein the plurality of radio frequency-enabled nodes are lighting devices.

10. The system of claim 1, wherein the radio frequency-enabled device further comprises a passive power source connected to the radio frequency transceiver and the processing device.

11. The system of claim 1, wherein the radio frequency-enabled device further comprises an active power source connected to the radio frequency transceiver and the processing device.

12. The system of claim 1, wherein the radio frequency-enabled device further comprises at least one sensor configured to detect the occurrence of the event.

13. The system of claim 12, wherein the at least one sensor is a motion sensor that responds to movements of the radio frequency-enabled device.

14. The system of claim 1, wherein the transmitted radio frequency signal includes a node ID of the respective node.

15. The system of claim 1, further comprising an edge gateway coupled for communication with the plurality of radio frequency-enabled nodes, wherein the edge gateway is configured to control and manage a network including radio frequency-enabled nodes in the area.

16. The system of claim 15, wherein the network is a data communication network configured to enable transmission of data between the network and external devices under the control of the edge gateway or another controller.

17. The system of claim 15, further comprising a fog gateway coupled for communication with the edge gateway, wherein the fog gateway comprises a fog gateway radio frequency transceiver and a fog gateway processor.

18. A method, comprising:
transitioning a radio frequency-enabled device from a default standby mode to a transmit mode in response to expiration of a time period or an occurrence of an event;

upon transitioning to the transmit mode, broadcasting, by the radio frequency-enabled device, a start dialogue message to one or more radio frequency-enabled nodes networked to communicate in an area, wherein each respective node is configured to operate in a default receive mode, transition to a transmit mode to transmit a radio frequency signal for a predetermined period, and upon completion of the transmission of the radio frequency signal, immediately transition back to the default receive mode to await receipt of a signal to indicate a time for another transmission;

transitioning the radio frequency-enabled device, after a pause of a predetermined length defined in the start dialogue message, to a receive mode to receive a data packet transmitted from the one or more radio frequency-enabled nodes, wherein a predetermined period for the transmission of the data packet from the one or more radio frequency-enable nodes to the radio frequency-enabled device is defined by the radio frequency-enabled device, wherein the receive mode for the radio frequency-enabled device is initiated after the radio frequency-enabled device broadcasts the start dialogue message, and wherein the transition of the one or more radio frequency-enabled nodes from the default receive mode to the transmit mode occurs based only upon receipt of the start dialogue message from the radio frequency-enabled device; and immediately transitioning the radio frequency-enabled device from the receive mode to the default standby mode upon completion of receiving the data packet.

19. The method of claim 18, wherein the data packet is transmitted during the transmit mode of the one or more radio frequency-enabled nodes.

20. The method of claim 18, further comprising detecting the occurrence of the event using at least one sensor arranged to communicate with the radio frequency-enabled device.

21. The method of claim 20, wherein the at least one sensor is a motion sensor configured to respond to movements of the radio frequency-enabled device.

22. The method of claim 18, wherein the radio frequency-enabled device is an internet of things (IoT) device.

23. The method of claim 22, wherein the IoT device is at least one of a smart tag or a mobile device.

24. The method of claim 18, wherein the one or more radio frequency-enabled nodes are lighting devices.

25. A system, comprising:
at least two radio frequency-enabled devices networked to communicate in an area, wherein each radio frequency-enabled device comprises:
a radio frequency transceiver; and
a processing device,
wherein upon execution of instructions by the processing device, a first of the at least two radio frequency-enabled devices is configured to:
in response to expiration of a time period or an occurrence of an event, transition the first of the at least two radio frequency-enabled devices from a default standby mode to a transmit mode;

in the transmit mode, broadcast a start dialogue message from the first of the at least two radio frequency-enabled devices, wherein the start dialogue message includes timing information to initiate communication with a second of the at least two radio frequency-enabled devices and for the second of the at least two radio frequency-enabled devices to transition from a default receive mode to a transmit mode;

after a pause of a predetermined length defined in the start dialogue message, transition the first of the at least two radio frequency-enabled devices to a receive mode to receive a data packet transmitted by the second of the at least two radio frequency-enabled devices, wherein a predetermined period for transmission of the data packet from the second of the at least two radio frequency-enabled devices to the first of the at least two radio frequency-enable devices is defined by the first of the at least two radio frequency-enabled devices, wherein the receive mode for the first of the at least two radio frequency-enabled devices is initiated after the first radio frequency-enabled device broadcasts the start dialogue message, wherein the transition of the second of the at least two radio frequency-enabled devices from the default receive mode to the transmit mode occurs based only upon receipt of the start dialogue message from the first of the at least two radio frequency-enabled devices, and wherein upon completion of the transmission of the data packet, the second of the at least two radio frequency-enabled devices immediately transitions back to the default receive mode; and upon completion of receiving the data packet from the second of the at least two radio frequency-enabled devices, immediately transition the first of the at least two radio frequency-enabled devices to the default standby mode.

26. The system of claim 25, wherein the at least two radio frequency-enabled devices are mobile devices.

27. The system of claim 25, wherein the at least two radio frequency-enabled devices are lighting devices.

28. The system of claim 25, wherein:
the first of the at least two radio frequency-enabled devices is a smart tag or a mobile device, and
the second of the at least two radio frequency-enabled devices is a lighting device.

29. The system of claim 26, wherein the start dialogue message includes identifying information of the first of the at least two radio frequency-enabled devices.

30. The system of claim 25, wherein:
the data packet is transmitted during the transmit mode of the second of the at least two radio frequency-enabled devices.

31. The system of claim 25, wherein the first of the at least two radio frequency-enabled devices further comprises at least one sensor configured to detect the occurrence of the event.

32. The system of claim 31, wherein the at least one sensor is a motion sensor that responds to movements of the at least two radio frequency-enabled devices.

* * * * *